United States Patent Office 3,320,333
Patented May 16, 1967

3,320,333
CURABLE JOINT SEALING COMPOSITIONS COMPRISING HALOGENATED BUTYL RUBBER, PHENOL-ALDEHYDE RESIN, AND PETROLEUM HYDROCARBON RESIN
Fred Battline, Bayshore, N.Y., assignor to W. R. Grace & Co., Cambridge, Mass., a corporation of Connecticut
No Drawing. Filed Apr. 7, 1964, Ser. No. 358,071
5 Claims. (Cl. 260—846)

This invention relates to rubber-based sealants. In a particular aspect, it relates to a composition for sealing joints where a tight seal is required, such as in building construction and maintenance, for closing perimeter joints of windows, doors, vents, expansion-contraction joints, spacing between precast sections, and in sealing joints in the marine and auto industry.

The oldest type of mastic caulking compound has been made with semi-drying oil media having a vehicle which would not harden readily and eventually fall out of the joint. Compounds presently available perform satisfactorily for a period of a few years but then become less reliable because they develop weak cohesive strength and low elongation. These compounds merely form a surface skin within the first few days of exposure and some actually remain wet beneath the skin surface for several years. Although it is known to modify such oil-based compounds with non-drying polyisobutylenes to improve their properties, they are nevertheless still subject to substantially the same deficiencies as the straight semi-drying products.

Polysulfied rubber-based sealants have been suggested for caulking purposes. While their costs are substantially higher than the oil type, they are preferred because of their ability to cure throughout the mass to provide cohesive strength. These compounds are considered as true sealants rather than caulks. They show high elongation and recovery properties so that they could adjust to movements in the structure without developing a break in the sealant through which water, wind, soil, etc., would gain access. Besides their undesirable high cost, the polysulfied type sealants are generally two-package products which require mixing at the job site and must be used within a few hours time.

Other synthetic rubber-based compounds have been offered to fill the wide gap between the oil type and the polysulfied sealants. Illustrative compounds are those based on polyurethane, chloro-sulfonated polyethylene and butyl rubber. Of these, the latter shows the greatest promise of satisfying the requirements of the construction and maintenance industry. Butyl rubber compounds function much better than the typical semi-drying oil-based caulking compounds in that they provide greater elongation properties throughout the period of exposure to the atmosphere and are distensible even at temperatures below 0° F. The latter is a serious failing with the semi-drying oil-based type. Butyl rubber has a degree of unsaturation lower than semi-drying oils and is, therefore, less subject to oxidative degradation. A distinct advantage of the butyl rubber sealant is its availability as a single package. However, its main deficiency has been that the properties are much closer to the semi-drying oil compounds in performance and inferior to the polysulfied-based compounds. In addition, it is necessary to employ high temperatures with appropriate agents in order to vulcanize regular butyl rubber. This renders such a polymer incapable of vulcanizing in the field at environmental temperatures.

It is, therefore, an object of this invention to provide a rubber-based sealing composition as a single package that has the desirable attributes of the polysulfide type but whose cost is considerably less. This objective is achieved by the use of a halogenated butyl rubber compounded with a heat-reactive phenol-aldehyde resin and a petroleum hydrocarbon resin to obtain the desired sealing properties.

Butyl rubber is produced by coreacting a monolefin, such as isobutylene, with a diolefin, such as isoprene and butadiene. The monoolefin predominates and it is usual to have the diolefin present up to about 5 percent by weight. If this copolymer is reacted with a halogen, such as fluorine, chlorine, or bromine, it has been found that the properties of the compounded sealant are vastly improved. When applied to joints, it will gradually cure throughout the mass and thereby provide desirable cohesive properties and also develop elastic-recovery properties that are lacking in the unhalogenated polymer.

Halogenation permits compounding of the sealant in a single sealed package which on exposure develops further polymerization activity. Vulcanization of the rubber proceeds at normal temperature and pressure without the use of high heat or strong catalysts which generally are resorted to with the unhalogenated butyl rubber compositions. Halogenation adds at some of the unsaturation points but some substitution also occurs. The extent of halogenation is such as to avoid eliminating all unsaturation sites. This allows a degree of vulcanization to occur with the activity of the residual double bonds or through the reactive halogen or by both methods. It has been observed that a halogenated butyl rubber vulcanizes at normal climatic temperature even with a single package compound and it remains unreactive until a bead is applied and the material is exposed to light and the atmosphere.

The halogenated butyl rubber is produced by reacting the unvulcanized butyl rubber with a halogen, such as chlorine, bromine or halogen-containing compounds, so that the polymer contains at least 1.0 weight percent of combined halogen but not more than 1.5 weight percent, perferably between about 1.0 and 1.3 weight percent, of halogen in the polymer.

According to this invention, the use of a phenol-aldehyde resin together with the aid of a petroleum hydrocarbon resin enables the halogenated butyl rubber to vulcanize at normal temperature. The process proceeds slowly but it requires only 2 or 3 weeks time after application for evidence of reinforcement of the compound to occur. It has been noted that the compound shows activity throughout the mass of an applied bead and that the Shore A durometer reading increases from 0 to approximately 25 in a 3-week period and rises slowly with increased time to a reading of 35 to 40. At the same time it has been observed that desirable resilient and elastic qualities have developed.

One possible explanation for vulcanization at ordinary temperatures is that the halogenated butyl rubber near the double bond absorbs light photon radiation which momentarily raises its energy level and then it disassociates into reactive free macro radicals. These radicals can induce side reactions which probably lead to branching or cross-linking and thus to vulcanization. It is also believed that atmospheric oxygen plays a part in reactivating this process because it is known that a halogenated polymer can be polymerized further by means of oxidizing agents, such as quinone dioxime and zinc peroxide.

The phenol-aldehyde resins employed in the compositions of this invention include those made from phenol and formaldehyde and p-alkyl phenol-formaldehyde condensates. Examples of the latter resins are condensates of formaldehyde and p-lower alkyl phenols containing 1 to 6 carbon atoms in the alkyl group, such as p-methyl phenol, p-ethyl phenol, p-butyl phenol and p-tertiary butyl phenol.

The petroleum hydrocarbon resin assists the phenol-aldehyde resin in accelerating vulcanization of the halogenated butyl polymer and is obtained from the residue in cracking petroleum stocks. The cracking of petroleum hydorcarbons produces an appreciable amount of olefins, diolefins and cycloolefins in the cracked distillate, such as ethylene, butylene, isobutylene, butadiene, isoprene, cyclohexene and cyclopentadiene. These unsaturated hydrocarbons are detrimental to the gasoline since they tend to polymerize and form gummy resinous deposits in tanks and lines. They are, therefore, removed by polymerization in the gasoline by means of catalysts, such as $AlCl_3$. Accordingly, as used herein and elsewhere, the term "petroleum hydrocarbon resin" refers to that polymerizate derived from the cracked distillate composed of unsaturated hydrocarbons.

The petroleum hydrocarbon resins are available in solid, flaked or soultion form. They are thermoplastic, practically neutral, and are soluble in all aliphatic and aromatic hydrocarbons, in most esters, ethers and ketones, and in some alcohols. They are unsaponifiable and the iodine number ranges from about 130 to 200 or higher. The high iodine value indicates the presence of reactive double bonds through which the resin may react further with the unsaturated bonds of the halogenated butyl rubber.

The sealing composition is modified by including various additives to impart certain properties. A saturated liquid hydrocarbon, such as polyisobutylene, may be included as a plasticizer. Fillers, such as talc, absentine, asbestos fibers and silica flour, are added for bulk and to develop the proper rheological properties. Pigments whose main function is color, such as lithopone, zinc oxide, titanium dioxide, iron oxide, and chromium oxide should be used in amounts only necessary to obtain the desired color. Excessive amounts of the color pigments may harden the composition and increase the cost unnecessarily. A gelling agent, such as a metallic soap (aluminum or calcium stearate), or a fumed silica flour may be used to control bleeding of some components from the body of the composition.

The components may be combined in any type of equipment that permits mixing of sufficient rigor to wet all particles, break up large agglomerates and to secure and maintain a homogoneous mixture.

A commercial butyl rubber having a molecular weight of about 40,000 was combined with 1.2 percent by weight of bromine. The rubber was made by cold polymerization of isobutylene and 2 percent isoprene in the presence of a Friedel-Crafts type catalyst. It is noted that the amount of bromine added was less than the amount of isoprene contained in the copolymer. This yielded a polymer having unsaturated sites which were available for vulcanization. The polymer was reduced to a 50 percent by weight cut-back in petroleum distillate using a heavy duty Banbury mixer. To this there was then blended a para alkyl phenol-formaldehyde condensation polymer and a petroleum hydrocarbon resin as vulcanizer aids. A liquid polyisobutylene was included as a plasticizer. Pigments and fillers were then compounded into the mastic to develop the necessary rheological properties so that the compound would stay fixed and not run out when applied to vertical or overhead joints.

When this mastic was filled into sealed containers, it remained stable. On application as a joint sealant it became exposed to light and to atmospheric oxygen and a vulcanizing process gradually proceeded. As previously stated, it was postulated that the presence of a halogen in the polymer chain plus the presence of oxygen would cause the formation of a macro radical near the bromine positions. It is further theorized that the phenol-formaldehyde condensation resin aided by the unsaturated petroleum hydrocarbon resin may link these reactive sites and bring about vulcanization of the halogenated butyl rubber.

There is another possible method by which this vulcanization proceeds. It is well known that unsaturated halides can be polymerized even without the presence of free radicals by irradiation with ultra-violet light. The photochemical activity is initiated by light attacking the halogen linkage and then the cross-linking proceeds at two points: (1) adjacent to the reactive halogen position and (2) through the double bonds. In this interpretation it is assumed that the phenol-formaldehyde resin activates the cross-linking mechanism but does not actually form the bridge between the links.

The invention is further illustrated by the following specific examples:

*Example 1*

A light gray sealant was prepared by dissolving with agitation

|  | Lbs. |
|---|---|
| Xylol | 74.3 |
| Petroleum hydrocarbon resin | 44.6 |
| Phenol-formaldehyde condensate | 29.7 |

The mixture was then blended with

|  | Lbs. |
|---|---|
| Polyisobutylene | 66.9 |
| Hydrogenated methyl abietate | 14.9 | and then combined with

|  | Lbs. |
|---|---|
| Chlorinated 95% isobutylene-5% isoprene copolymer containing 1.2% chlorine | 122.6 | and dissolved in

|  | Lbs. |
|---|---|
| Xylol | 122.6 |

The constituents were thoroughly agitated to form a homogeneous solution to which there was then gradually added

|  | Lbs. |
|---|---|
| Aluminum stearate | 126.3 |
| Standard aluminum lining paste | 4.5 |
| Titanium dioxide | 29.7 |
| Atomized calcium carbonate | 505.2 |

The entire mixture was then agitated for about one hour to a smooth consistency. The product had a non-volatile content of 82.5% and a density of 11.1 lbs./gal.

*Example 2*

Another light gray sealant was prepared as follows:

|  | Lbs. |
|---|---|
| Xylol | 80.4 |
| Petroleum hydrocarbon resin | 48.3 |
| Phenol-formaldehyde condensate | 32.0 | were dissolved by agitation and mixed with

|  | Lbs. |
|---|---|
| Polyisobutylene | 72.5 |
| Hydrogenated methyl abietate | 16.1 |

The mixture was then blended with

|  | Lbs. |
|---|---|
| Chlorinated 95% isobutylene-5% isoprene copolymer containing 1.2% chlorine | 132.7 | and dissolved in

|  | Lbs. |
|---|---|
| Mineral spirits | 132.7 | to which the following ingredients were gradually added

|  | Lbs. |
|---|---|
| Aluminum stearate | 32.5 |
| Standard aluminum lining paste | 4.9 |
| Titanium dioxide | 32.1 |
| Fine powdered whiting | 324.7 |
| Silica flour | 222.1 |
| Fumed silica flour | 49.7 |

The final product had a non-volatile matter content of 82.7%.

*Example 3*

|  | Lbs. |
|---|---|
| Cobalt naphthenated solution | 0.5 |
| Polyisobutylene | 105 |

| | Lbs. |
|---|---|
| Raw linseed oil | 64 |
| Flaked petroleum hydrocarbon resin | 55 |
| Phenol-formaldehyde condensate | 34 |

The above ingredients were cooked at 250° F. to a clear varnish and then poured into a putty mill. The following components were then added in the order in which they appear for rapid mixing:

| | Lbs. |
|---|---|
| Hydrogenated methyl ester of rosin | 22 |
| Aluminum stearate | 26 |
| Aluminum lining paste | 5 |
| Titanium dioxide | 36 |
| Whiting | 650 |
| Long asbestos fibres | 22 |
| Chlorinated 95% isobutylene-5% isoprene copolymer containing 1.2% chlorine | 123 |
| and dissolved in | |
| Naphtha | 123 |

The components were mixed for one hour. The finished composition had the following properties:

| | |
|---|---|
| Density | 11.9 lbs./gal. |
| Viscosity | 310–350 centipoises at 85° F.–110° F. |
| Wt. solids | 91%. |
| Vol. solids | 83.7%. |

*Examples 4, 5 and 6*

The compositions of Examples 1, 2 and 3 were duplicated except that a brominated isobutylene-isoprene copolymer containing 1.2% bromine was substituted for the chlorinated copolymer.

The proportions of the components of the composition may be varied somewhat. For best results, the halogenated butyl rubber should constitute between about 3.5 and 5.0; the phenol-aldehyde should be present in amounts ranging between about 1.0 and 1.5; and the petroleum hydrocarbon resin should be included in amounts ranging between about 1.0 and 2.5, all proportions being expressed on a parts-by-weight basis.

The rubber sealants of this invention are based on a blend of synthetic components for sealing joints where a tight seal is required. They set up in one-half hour with a dust-free surface and after three weeks, under normal weather and temperature conditions (77° F. and 50% humidity), they attain a Shore A durometer hardness of approximately 25. They are unaffected by temperatures ranging from −20° F. through 200° F. The elongation properties vary between 150% and 300% depending on temperature. The sealants are unaffected by weathering and ozone deterioration and laboratory tests and job applications revealed that when properly installed they outperform commercial caulking compounds better than 5 to 1.

They may be applied by caulking gun, trowel, or knife to any surface, crack or joint. They bond to concrete, iron, aluminum, bronze, rubber, steel, stainless steel, marble, glass, wood and are very effective for curtain wall construction. The sealants may be easily coated with paint after five days.

I claim:
1. A curable sealing composition comprising between about 3.5 to 5.0 parts by weight of a halogenated rubbery copolymer containing a major amount of isobutylene copolymerized with up to about 5% by weight of a diolefin, said copolymer containing between about 1.0 and 1.5 weight percent of combined halogen, between about 1.0 to 2.5 parts by weight of a petroleum hydrocarbon resin which is a polymerizate derived from the cracked distillate composed of unsaturated hydrocarbons and between about 1.0 and 1.5 parts by weight of a heat-reactive phenol-aldehyde resin, said resin being a condensate of formaldehyde and a compound selected from the group consisting of phenol and p-alkyl phenol having 1 to 6 carbon atoms in the alkyl group.

2. A composition according to claim 1 wherein the halogenated rubbery copolymer is chlorinated isobutylene-isoprene.

3. A composition according to claim 1 wherein the halogenated rubbery copolymer is brominated isobutylene-isoprene.

4. A curable sealing composition comprising 4.2 parts by weight of a chlorinated 95% isobutylene-5% isoprene copolymer containing 1.2% chlorine, 1.5 parts by weight of a petroleum hydrocarbon resin which is a polymerizate derived from the cracked distillate composed of unsaturated hydrocarbons and 1 part by weight of a heat-reactive phenol-formaldehyde resin, said resin being a condensate of formaldehyde and a compound selected from the group consisting of phenol and p-alkyl phenol having 1 to 6 carbon atoms in the alkyl group.

5. A curable sealing composition comprising 3.6 parts by weight of a chlorinated 95% isobutylene-5% isoprene copolymer containing 1.2% chlorine, 1.6 parts by weight of a petroleum hydrocarbon resin which is a polymerizate derived from the cracked distillate composed of unsaturated hydrocarbons, and 1 part by weight of a heat-reactive phenol-formaldehyde resin, said resin being a condensate of formaldehyde and a compound selected from the group consisting of phenol and p-alkyl phenol having 1 to 6 carbon atoms in the alkyl group.

References Cited by the Examiner

UNITED STATES PATENTS

| | | | |
|---|---|---|---|
| 2,967,167 | 1/1961 | Minckler et al. | 260—846 |
| 3,008,915 | 11/1961 | Fusco et al. | 260—846 |
| 3,050,479 | 8/1962 | Ziarnik | 260—846 |

MURRAY TILLMAN, *Primary Examiner.*

J. C. BLEUTGE, *Assistant Examiner.*